United States Patent
Kolavennu et al.

(10) Patent No.: US 12,499,682 B2
(45) Date of Patent: Dec. 16, 2025

(54) SYSTEMS AND METHODS FOR VIDEO-BASED FRAUD DETECTION

(71) Applicant: U.S. Bank National Association, Minneapolis, MN (US)

(72) Inventors: Soumitri Naga Kolavennu, Plymouth, MN (US); Priyanka Singhal, Atlanta, GA (US); Varshini Sriram, Menlo Park, CA (US)

(73) Assignee: U.S. Bank National Association, Minneapolis, MN (US)

( * ) Notice: Subject to any disclaimer, the term of this patent is extended or adjusted under 35 U.S.C. 154(b) by 486 days.

(21) Appl. No.: 18/052,150

(22) Filed: Nov. 2, 2022

(65) Prior Publication Data

US 2024/0144683 A1    May 2, 2024

(51) Int. Cl.
  *G06V 20/40*    (2022.01)
  *G06V 10/70*    (2022.01)
  (Continued)

(52) U.S. Cl.
  CPC ............ *G06V 20/44* (2022.01); *G06V 10/768* (2022.01); *G06V 20/52* (2022.01); *G06V 40/161* (2022.01)

(58) Field of Classification Search
  CPC ...... G06V 10/25; G06V 10/70; G06V 10/764; G06V 10/768; G06V 10/82; G06V 20/40;
  (Continued)

(56) References Cited

U.S. PATENT DOCUMENTS 7,015,978 B2 *   3/2006  Jeffers ................. H04N 5/2723
                                                 348/E9.055
10,460,300 B2 *  10/2019 Xu .................... G06Q 20/40145
(Continued)

FOREIGN PATENT DOCUMENTS

GB          2422705 A  *  8/2006  ............. G07F 19/20
JP     2010-244570 A      10/2010
(Continued)

OTHER PUBLICATIONS

Dong, WenTao, and YoungSung Soh. "Image-based fraud detection in automatic teller machine." International Journal of Computer Science and Network Security 6.11 (2006): 13-18. (Year: 2006).*

(Continued)

*Primary Examiner* — Henok Shiferaw
*Assistant Examiner* — Toluwani Mary-Jane Ijaseun
(74) *Attorney, Agent, or Firm* — Merchant & Gould P.C.

(57) ABSTRACT

Aspects of the embodiments described herein are related to systems, methods, and computer products for performing computer-aided detection of fraud device installation events, especially at an Automated Teller Machine (ATM). Aspects of embodiments described herein provide artificial intelligence systems and methods that detect the presence of obstructions and persons to determine when a fraud device installation event occurs. The fraud detection system performs object detection and can determines whether a detected access event has an associated transaction to determine that a fraud device installation event occurs. The fraud detection system can also track the time the camera view is obstructed, the activity time of the person standing at the monitored device when no transaction occurs, and detect objects that resemble fraud devices to determine if a fraud device installation event occurs.

20 Claims, 6 Drawing Sheets

(51) Int. Cl.
*G06V 20/52* (2022.01)
*G06V 40/16* (2022.01)

(58) Field of Classification Search
CPC ........ G06V 20/44; G06V 20/46; G06V 20/52; G06V 40/161
See application file for complete search history.

(56) References Cited

U.S. PATENT DOCUMENTS

| | | | | |
|---|---|---|---|---|
| 10,477,156 | B2* | 11/2019 | Paliga | H04N 21/23109 |
| 11,170,375 | B1* | 11/2021 | Kramme | G06Q 30/0225 |
| 2008/0303902 | A1* | 12/2008 | Romer | G08B 13/19656 |
| | | | | 348/143 |
| 2009/0201372 | A1* | 8/2009 | O'Doherty | G07F 19/207 |
| | | | | 348/150 |
| 2010/0214413 | A1* | 8/2010 | Lin | G07G 3/003 |
| | | | | 348/150 |
| 2012/0026326 | A1* | 2/2012 | Itoh | G06V 10/30 |
| | | | | 348/143 |
| 2016/0005050 | A1* | 1/2016 | Teman | G06Q 30/018 |
| | | | | 705/317 |
| 2019/0236738 | A1* | 8/2019 | Lebel | G06F 18/214 |
| 2021/0097540 | A1* | 4/2021 | Sumpter | G07F 19/207 |
| 2022/0019854 | A1* | 1/2022 | Yan | G06V 10/44 |
| 2022/0130232 | A1* | 4/2022 | Kojima | G08B 13/19602 |

FOREIGN PATENT DOCUMENTS

| | | |
|---|---|---|
| WO | 2008/039401 A2 | 4/2008 |
| WO | 2019/071260 A1 | 4/2019 |

OTHER PUBLICATIONS

Sitara, K., and Babu M. Mehtre. "Automated camera sabotage detection for enhancing video surveillance systems." Multimedia Tools and Applications 78.5 (2019): 5819-5841. (Year: 2019).*

Khaire, Pushpajit A., and Praveen Kumar. "RGB+ D and deep learning-based real-time detection of suspicious event in Bank-ATMs." Journal of Real-Time Image Processing 18.5 (2021): 1789-1801 (Year: 2021).*

Khaleghi, Ali, and Mohammad Shahram Moin. "Improved anomaly detection in surveillance videos based on a deep learning method." 2018 8th Conference of AI & Robotics and 10th RoboCup Iranopen International Symposium (IRANOPEN). IEEE, 2018 (Year: 2018).*

Lewis, Brandon, "Computer Vision and AI Safeguard ATMs", insight.tech, Mar. 5, 2020, 6 pages.

* cited by examiner

| # | Date and Time | Trans_Type |
|---|---|---|
| 5 | 2020-10-02 06:32:13 | Withdraw |
| 4 | 2020-10-02 06:40:52 | Deposit |
| 3 | 2020-10-02 06:43:16 | Deposit |
| 2 | 2020-10-02 07:27:19 | Deposit |
| 1 | 2020-10-02 07:32:09 | Deposit |

| Start Time | End Time | Duration |
|---|---|---|
| 10/2/2020 6:31:29 AM | 10/2/2020 6:33:30 AM | 00:02:01 |
| 10/2/2020 6:39:15 AM | 10/2/2020 6:44:40 AM | 00:05:25 |
| 10/2/2020 7:26:18 AM | 10/2/2020 7:28:25 AM | 00:02:07 |
| 10/2/2020 7:31:08 AM | 10/2/2020 7:32:29 AM | 00:01:21 |
| 10/2/2020 8:09:44 AM | 10/2/2020 8:11:01 AM | 00:01:15 |

SYSTEMS AND METHODS FOR VIDEO-BASED FRAUD DETECTION

FIELD OF THE DISCLOSURE

Examples described herein generally relate to systems and methods for fraud detection, and more specifically, for video-based fraud detection.

BACKGROUND

Criminals attempt to commit fraud by targeting automated teller machines (ATMs) and other automated systems that collect and use financial information (e.g., a gas pump, a vending machine). One way criminals attempt to commit fraud is by installing fraud devices that capture financial information, including card readers, cameras, pin-pad overlays, and the like. These fraud devices are used to compromise the accounts of anyone who uses the targeted system. If not identified and removed, such fraud devices can cause significant financial loses and disruption. Typically, the presence of fraud devices is not identified for twenty-five days from the first use because the criminals who install the devices collect account information for many accounts before removing the fraud devices and using the account information to rob their victims.

Financial institutions may operate thousands of ATMs at different locations, and each ATM may be used for multiple transactions daily. Consequently, detecting fraud device installation events can be difficult or impossible simply through manual review of surveillance footage. Before a fraud device is installed on an ATM, a typical fraudster will first place a piece of tape over a camera that is used to monitor the ATM. The tape is particularly placed in such a manner that the tape partially covers the field of view of the camera. The tape is situated so as to obscure the face of the fraudster and/or the actions of the fraudster as they install the fraud devices. Additionally, the person involved in the installation event typically does not perform a transaction at the ATM. Therefore, what is needed is a system and method for the automated detection of a fraud device installation event.

SUMMARY

Aspects of the embodiments described herein are related to systems, methods, and computer products for performing computer-aided detection of fraud device installation events, especially at an Automated Teller Machine (ATM). Aspects of embodiments described herein provide artificial intelligence systems and methods that detect the presence of obstructions and a person to determine when a fraud device installation event occurs. The fraud detection system performs object detection (e.g., detecting tape and/or a person) and determines whether a detected ATM access event has an associated transaction to determine that a fraud device installation event occurs. The fraud detection system can also track the time the tape or some other object causes the camera view to be obstructed, the activity time of the person standing at the ATM when no transaction occurs, detect objects that resemble fraud devices (e.g., a pin-pad, a card reader), and the like to determine if a fraud device installation event occurs.

In an example embodiment, there is a method for detecting fraud device installation at an ATM. The method includes receiving a video of an area around the ATM; identifying one or more access events based on frames of the video that indicate a detected object in the area; identifying frames of the video associated with the one or more access events that are obstructed by an object using a machine learning technique; determining a fraud device installation event occurred based on determining that a predetermined number of frames from one of the access events are identified as partially obstructed; and assigning a flag to the frames associated with the fraud device installation event. The method can further include creating images of frames of the video, wherein identifying one or more access events based on the frames of the video that indicate the detected object includes evaluating the images; identifying frames of the video associated with the one or more access events that are obstructed by the object using the machine learning technique includes providing the images to the machine learning technique as input; and determining the fraud device installation event occurred based on determining that the predetermined number of frames from one of the access events are identified as partially obstructed includes evaluating the images. In some embodiments, identifying frames of the video associated with the one or more access events that are obstructed includes using additional machine learning techniques; and determining the fraud device installation event occurred based on determining that the predetermined number of frames from one of the access events are identified as partially obstructed includes determining at least two of (i) the machine learning technique, (ii) the additional machine learning techniques, or (iii) a combination of (i) and (ii) identify the predetermined number of frames from one of the access events as partially obstructed. In certain embodiments, the object is tape. The method can further include comprising determining no transaction occurred during an access event that includes frames that are obstructed, wherein determining the fraud device installation event occurred is based on the determination that no transaction occurred. The method can also include identifying a detected fraud device, wherein determining the fraud device installation event occurred is based on identifying the detected fraud device. The method can additionally include detecting a face of a person in one or more of the frames of the fraud device installation event; and storing an image of the face of the person. The method can further include detecting the face of the person in a new video based on accessing the image of the person; and determining a new fraud device installation event occurred based on detecting the face of the person in the new video. The method can include accessing one or more training videos; converting frames of the one or more training videos into images; adding artificial obstructions to a plurality of the images of the one or more training videos; and training the machine learning technique using the images of the one or more training videos. In an example implementation, adding artificial obstructions to the plurality of the images of the one or more training videos includes selecting a color, size, position, thickness, and opacity for the artificial obstructions.

In another embodiment, there is a system for video-based fraud detection, comprising a detection processor operable to receive a video of an area around a monitored device; identify one or more access events based on frames of the video that indicate a detected object in the area; identify frames of the video associated with the one or more access events that are obstructed by an object using a machine learning technique; determine a fraud device installation event occurred based on determining that a predetermined number of frames from one of the access events are identified as partially obstructed; and assign a flag to the frames associated with the fraud device installation event. The system can include a video processor operable to create images of frames of the video, wherein to identify one or more access events based on the frames of the video that indicate the detected object include to evaluate the images; identify frames of the video associated with the one or more access events that are obstructed by the object using the machine learning technique includes to provide the images to the machine learning technique as input; and determine the fraud device installation event occurred based on determining that the predetermined number of frames from one of the access events are identified as partially obstructed includes to evaluate the images. In some embodiments, to identify frames of the video associated with the one or more access events that are obstructed includes to use additional machine learning techniques; and to determine the fraud device installation event occurred based on determining that the predetermined number of frames from one of the access events are identified as partially obstructed includes to determine at least two of (i) the machine learning technique, (ii) the additional machine learning techniques, or (iii) a combination of (i) and (ii) identify the predetermined number of frames from one of the access events as partially obstructed. In certain embodiments, the object is tape. The detection processor can be further operable to determine no transaction occurred during an access event that includes frames that are obstructed, wherein determining the fraud device installation event occurred is based on the determination that no transaction occurred. The detection processor can be further operable to identify a detected fraud device, wherein determining the fraud device installation event occurred is based on identifying the detected fraud device. The detection processor can be further operable to detect a face of a person in one or more of the frames of the fraud device installation event; and store an image of the face of the person. The detection processor can be further operable to detect the face of the person in a new video based on accessing the image of the person; and determine a new fraud device installation event occurred based on the detection. The detection processor can be further operable to access one or more training videos; convert frames of the one or more training videos into images; add artificial obstructions to a plurality of the images of the one or more training videos; and train the machine learning technique using the images of the one or more training videos. In some embodiments, to add artificial obstructions to the plurality of the images of the one or more training videos includes selecting a color, size, position, thickness, and opacity for the artificial obstructions.

DETAILED DESCRIPTION

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Figure 1:
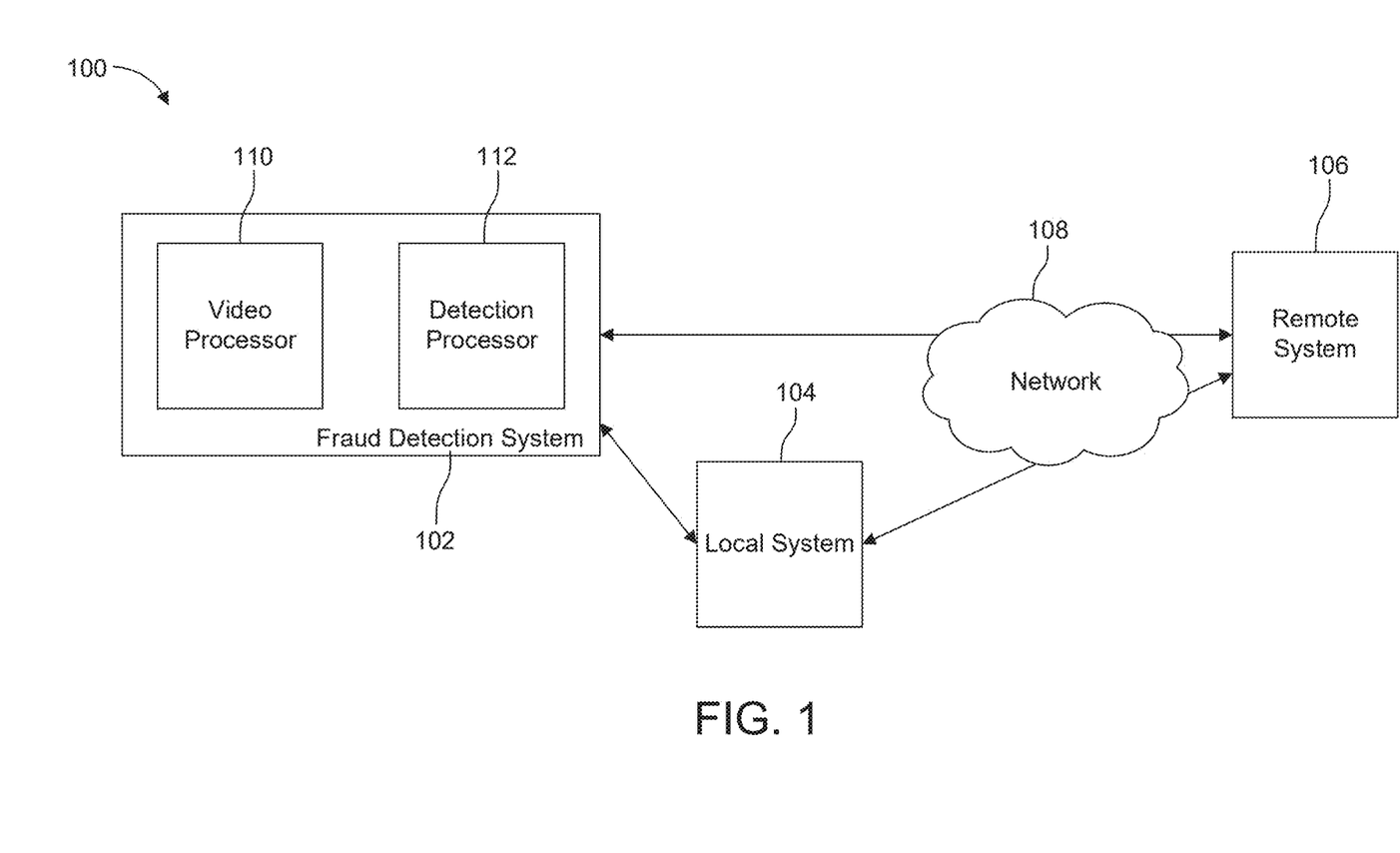
FIG. 1 illustrates an operating environment for providing a fraud detection system.

FIG. 1 illustrates an operating environment 100 for providing a fraud detection system 102. The fraud detection system 102 includes a video processor 110 and a detection processor 112. The operating environment 100 also includes a local system 104 and a remote system 106. The fraud detection system 102 and/or the local system 104 communicate with the remote system 106 via a network 108. In some embodiments, the fraud detection system 102 and the local system 104 also communicate using the network 108. In an example implementation, the local system 104 is associated with a device the fraud detection system 102 is monitoring. For example, the fraud detection system 102 monitors an Automated Teller Machine (ATM) at a location of a financial entity, and the local system 104 is a system associated with the financial entity that is local to the financial entity's location, such as a security system, a camera system, a video recording system, and the like. The remote system 106 is remote to the financial entity's location. For example, the remote system 106 can be a cloud computing service, a system associated with the financial entity at another location, and the like.

The fraud detection system 102 detects fraud events by detecting the presence of obstructions such as tape covering the view of a camera, detecting people, detecting fraud devices, matching transaction logs with access events, using face recognition, using embeddings, using hand and pose models, using custom object models, and the like to detect fraud device installation events. A person can place the obstructions to partially cover the view of the camera or to fully cover the view of the camera. Persons attempting to install fraud devices may position the obstruction to partially obstruct the view of a camera to avoid triggering alerts by monitored devices, but the fraud detection system 102 detects the partial obstructions to detect the fraud event. Fraud devices include card readers, cameras, Personal Identification Number (PIN) capturing devices, faceplates, and other devices used to obtain sensitive or otherwise personal information. A fraud device installation event is the installation of a fraud device at a device the fraud detection system 102 is monitoring.

In some embodiments, the fraud detection system 102 implements one or more machine learning techniques for object detection using the detection processor 112, such as detecting partial obstructions placed over the camera's field of view and the presence of people. The machine learning techniques can be any model, such as a Convolutional Neural Network (CNN), a deep neural network. In certain embodiments, the CNN is a Residual Network (ResNet), a MobileNet, an AlexNet, or the like. The machine learning techniques are trained using videos that have objects for the machine learning techniques to detect in some embodiments. For example, the videos include an obstruction (e.g., tape) artificially placed to partially obstruct the view for certain portions of the videos.

The fraud detection system 102 operates to use the video processor 110 to save frames of videos as images. The video processor 110 creates the images in formats and sizes to be used by the detection processor 112. In some embodiments, the video processor 110 tags the images with the identity of the associated video, a camera, a location, a date, a time stamp, and the like. The video processor 110 can store the images locally, such as on the monitored device and/or the local system 104, or remotely, such as on the remote system 106. The detection processor 112 may operate to access the stored images from the monitored device, the local system 104, and/or the remote system 106. The detection processor 112 uses the images for object detection. For example, the detection processor 112 executes machine learning techniques, and the machine learning techniques accept the images as input or otherwise use the images to perform object detection. In some embodiments, the detection processor 112 uses the tags (e.g., the location, the date, the time stamp) to determine the location, date, and time of images where an object is detected.

The fraud detection system 102 operates to first detect motion of an object in a video before determining if a fraud event is occurring. For example, the detection processor 112 evaluates images the video processor 110 creates to detect an object. The fraud detection system 102 then determines whether the detected motion of one or more objects is associated with an access event. An access event is when the monitored device is being used or otherwise accessed (e.g., by a person), whether for a legitimate transaction or to install fraud devices. An example access event includes a monitored ATM being accessed by a person to perform a financial transaction. In example implementations, the fraud detection system 102 logs the time of each detected access event. The fraud detection system 102 can determine if a detected access event time corresponds with a transaction time of a monitored device as part of determining if a fraud event occurs. For example, the fraud detection system 102 determines the ATM is being used (e.g., by a person) for a financial transaction during an access event is less likely to being used to enable a fraud event and the ATM that is not being used for a financial transaction during an access event is more likely being used to enable a fraud event.

When the fraud detection system 102 determines that an access event is occurring in images, the detection processor 112 operates to execute one or machine learning techniques to determine if a fraud event occurs. For example, the detection processor 112 executes or otherwise uses the machine learning techniques to review the images corresponding to the frames of the video associated with an access to determine whether the field of view of the camera is obstructed, such as by tape placed in front of at least a portion of the field of view of the camera (e.g., by the person associated with the access event). In some embodiments, the detection processor 112 also determines if a fraud device is detected, a person known to install fraud devices is associated with the access event (e.g., using facial recognition to detect a person), and/or the like.

When the detection processor 112 executes the machine learning techniques, the machine learning techniques can determine a fraud event occurs and/or flag the sequence of images as a potential fraud event when the machine learning techniques determine that the images are obstructed for a predetermined number of frames in a period. In an example implementation, the machine learning techniques determine a fraud event occurs and/or flag the sequence of images when at least ten frames in a fifteen frame period are obstructed, such as by tape. The detection processor 112 also determines a fraud event occurs and/or flag the sequence of images when a number of the machine learning techniques determine a fraud event has or has potentially occurred. For example, the detection processor 112 executes four machine learning techniques and determine a fraud event occurs and/or flag the sequence of images when at least two of the four machine learning techniques determine a fraud event occurs or potentially occurs.

If the fraud detection system 102 determines that a fraud device installation event occurs and the face of the person that installed the device is captured, the system stores the image of the face in an example. The fraud detection system 102 can perform facial detection using the stored image of the face to detect the presence of the same person at the same ATM or another location, such as another ATM operated by the financial institution, because people that install fraud devices may return to access the data the devices have collected and/or install additional fraud devices. In some embodiments, the fraud detection system 102 also receives images of person(s) known to be associated with fraud events to use for facial recognition as a part of the fraud detection.

In certain embodiments, the fraud detection system 102 is executed locally by the monitored device, using the device's components and/or a standalone system installed in the monitored device, using hardware at the financial institution branch where the monitored device is located, or using cloud or otherwise remote services. When the system is executed locally, such as at a monitored ATM or at the branch where the ATM is located, the fraud detection system 102 can determine the occurrence of the installation event substantially simultaneously as the event occurs. When the system is executed remotely, such as when using cloud services, the detection of the installation of the event may be delayed. However, the fraud detection can execute remotely to take advantage of higher compute power compared to hardware installed at the monitored ATM or financial institution branch systems. Thus, the fraud detection system 102 executes some operations locally in some implementations and other operations remotely in other implementations based on performing the detection as quickly as possible while selecting hardware powerful enough to execute the machine learning techniques and other operations of the fraud detection system. Therefore, the fraud detection system 102 can be a part of the device the fraud detection system 102 is monitoring (e.g., an ATM) or receive videos from the device the fraud detection system 102 is monitoring, can be a part of the local system 104, and/or can be a part of the remote system 106. For example, the fraud detection system 102 analyzes videos to detect fraud at the system the fraud detection system 102 is monitoring in near real time, at the local system 104, and/or at the remote system 106.

In some embodiments, the fraud detection system 102 determines where to perform the fraud detection (e.g., at the monitored device, the local system 104, or the remote system 106) based on factors including the desired latency, the compute and memory requirement, and the types and complexity of model used for fraud detection. For example, the fraud detection system 102 may have lower latency but lower processing power when performing fraud detection at the monitored device compared to at the local system 104 or the remote system 106. Using the local system 104 may result in higher latency and higher processing power compared to performing the fraud detection at the monitored device and a lower latency and lower processing power compared to performing the fraud detection at the remote system 106. Using the remote system 106 may result in a higher latency and a higher processing power compared to performing the fraud detection at the monitored system or the local system. Thus, the fraud detection system 102 can perform the fraud detection at the monitored device, the local system 104, or the remote system 106 based on speed and processing power requirements.

When the fraud detection system 102 is detecting fraud by detecting obstructions (e.g., tape over the camera partially obstructing the view) and detection people, the processing power required may be low enough for the fraud detection system 102 to perform fraud detection at the monitored system and/or the local system 104. Thus, the fraud detection system 102 may detect fraud events as quickly as possible. Alternatively, when the fraud detection system 102 is detecting fraud using face recognition, embeddings, hand and pose models, and/or custom object models, the processing power may require the fraud detection system 102 to detect fraud using the local system 104 and/or the remote system 106 based on the processing power available to the local system 104. Therefore, the fraud detection system 102 can use the higher processing power of the local system 104 and/or the remote system 106.

In example implementations, the fraud detection system 102 uses a combination of the system located on the monitored device, the local system 104, and/or the remote system 106. For example, the fraud detection system 102 performs initial fraud detection at the monitored device and flags potential fraud events and then uses the local system 104 and/or the remote system 106 to perform additional fraud detection for the flagged potential fraud events to determine if there was a fraud event. The fraud detection system 102 sends or otherwise notifies a user of potential fraud events so the user can review the potential fraud events to determine if there was a fraud event in some examples. The notification may be sent to a nearby financial institution location so that an employee of the financial institution can also remove the fraud device from the monitored device.

In certain embodiments, the fraud detection system 102 also determines the time of the installation event, using the tags the video processor 110 creates for example, and determines whether accounts accessed the ATM after the installation event to notify the customer associated with the account, change account information to prevent the account from being accessed, and the like. More account information is likely to be acquired the longer a fraud device is installed, so the fraud detection system 102 attempts to detect fraud events as quickly as possible. Once the fraud detection system 102 determines a fraud event occurs, a user can remove the fraud device from the monitored system before more people have their accounts compromised. Additionally, when the fraud detection system identifies an occurrence of an installation event, the fraud detection system 102 causes the monitored ATM to shut down or otherwise cease operation, create a flag, and/or send a notification in some examples.

Figure 2:
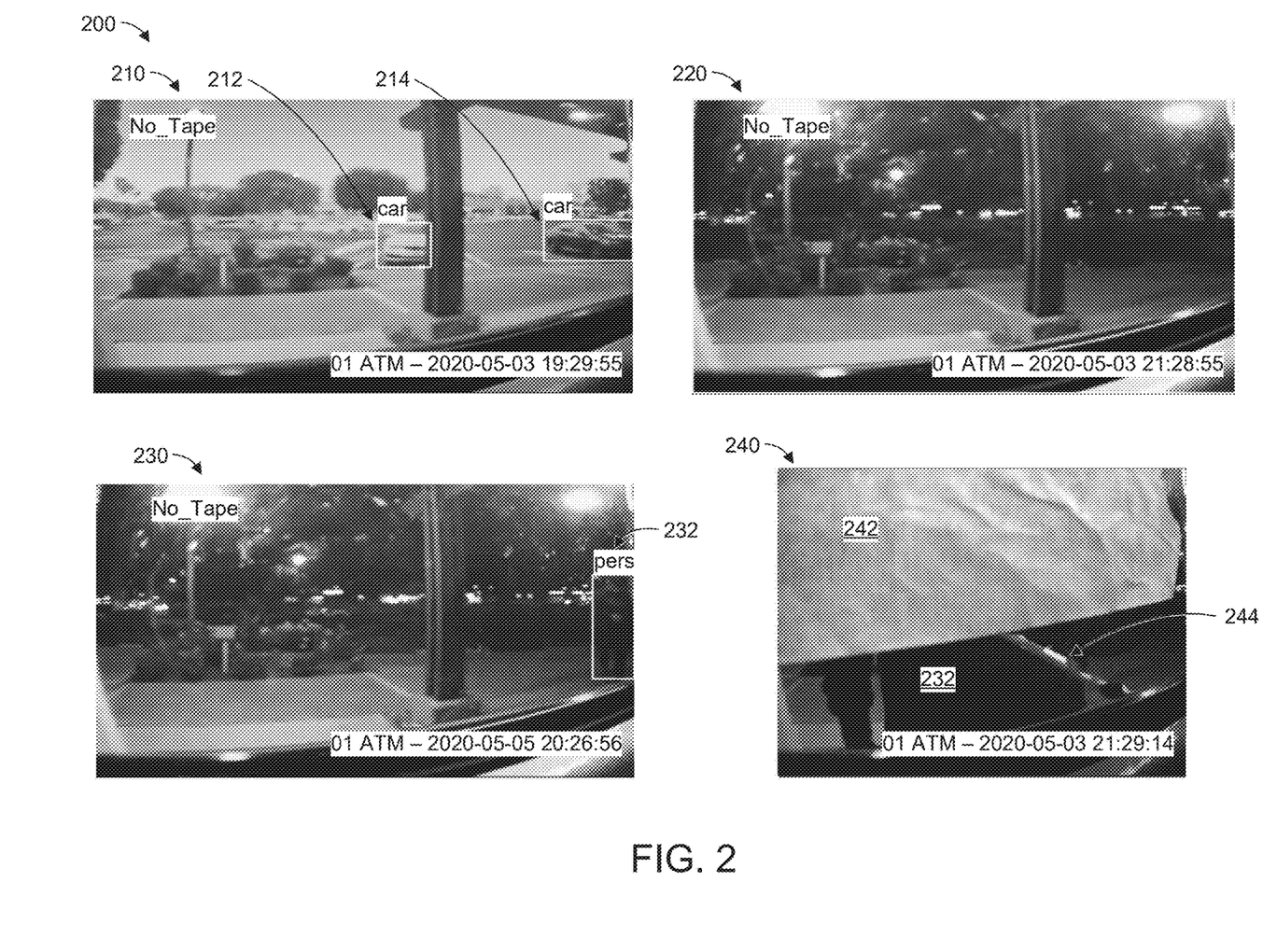
FIG. 2 illustrates example images of video frames for the fraud detection system to detect objects.

FIG. 2 illustrates example images of video frames 200 for the fraud detection system 102 to detect objects. The images of the video frames include a first image 210, a second image 220, a third image 230, and a fourth image 240. The video processor 110 creates the first image 210, the second image 220, the third image 230, and the fourth image 240 from frames of a video a monitored ATM captured. In some embodiments, the video processor 110 tags the first image 210, the second image 220, the third image 230, and the fourth image 240 with a location, a date, and a time. The detection processor 112 can use the tags to determine the sequence of images and track the movement of detected objects.

The first image 210 includes a first detected vehicle 212 and a second detected vehicle 214. The fraud detection system 102 operates to detect the first detected vehicle 212 and the second detected vehicle 214 using the detection processor 112. The fraud detection system 102 may determine that the first detected vehicle 212 and the second detected vehicle 214 do not indicate an access event is occurring because the vehicle cannot access the monitored device and therefore determine that the detection processor 112 does not need to perform fraud detection.

The fraud detection system 102 operates to determine that there are no detected objects in the second image 220. Thus, the fraud detection system 102 determines that there is no access event and the detection processor 112 does not need to perform fraud detection.

The third image 230 is after the second image 220 and includes a detected person 232. The fraud detection system 102 operates to use the third image 230 and subsequent images, such as the fourth image 240, to determine if the detected person 232 is associated with an access event. For example, the fraud detection system 102 determines an access event occurs when the fraud detection system 102 determines the detected person 232 approaches the monitored device in images after the third image 230, such as images with time tags after the third image 230. The fraud detection system 102 operates to use the third image 230 to determine to begin monitoring for an access event associated with the detected person 232 in subsequent images.

The fourth image 240 is after the third image 230, so the fraud detection system 102 operates to monitor the fourth image 240 to associate the detected person 232 with an access event. The fourth image 240 includes the detected person 232, a partial obstruction 242, and a fraud device 244. The fraud detection system 102 operates to determine an access event occurs, using the third image 230, the fourth image 240, images between the third image 230 and the fourth image 240, and/or images after the fourth image 240, because the detected person 232 has approached the monitored system and appears to be using the monitored device. In this example, the fraud detection system 102 determines a fraud event occurs because of the detected partial obstruction 242 and the detected fraud device 244. The fraud detection system 102 operates to use the fourth image 240 and images before and/or after the fourth image 240 to determine the fraud event occurs.

Figure 3:
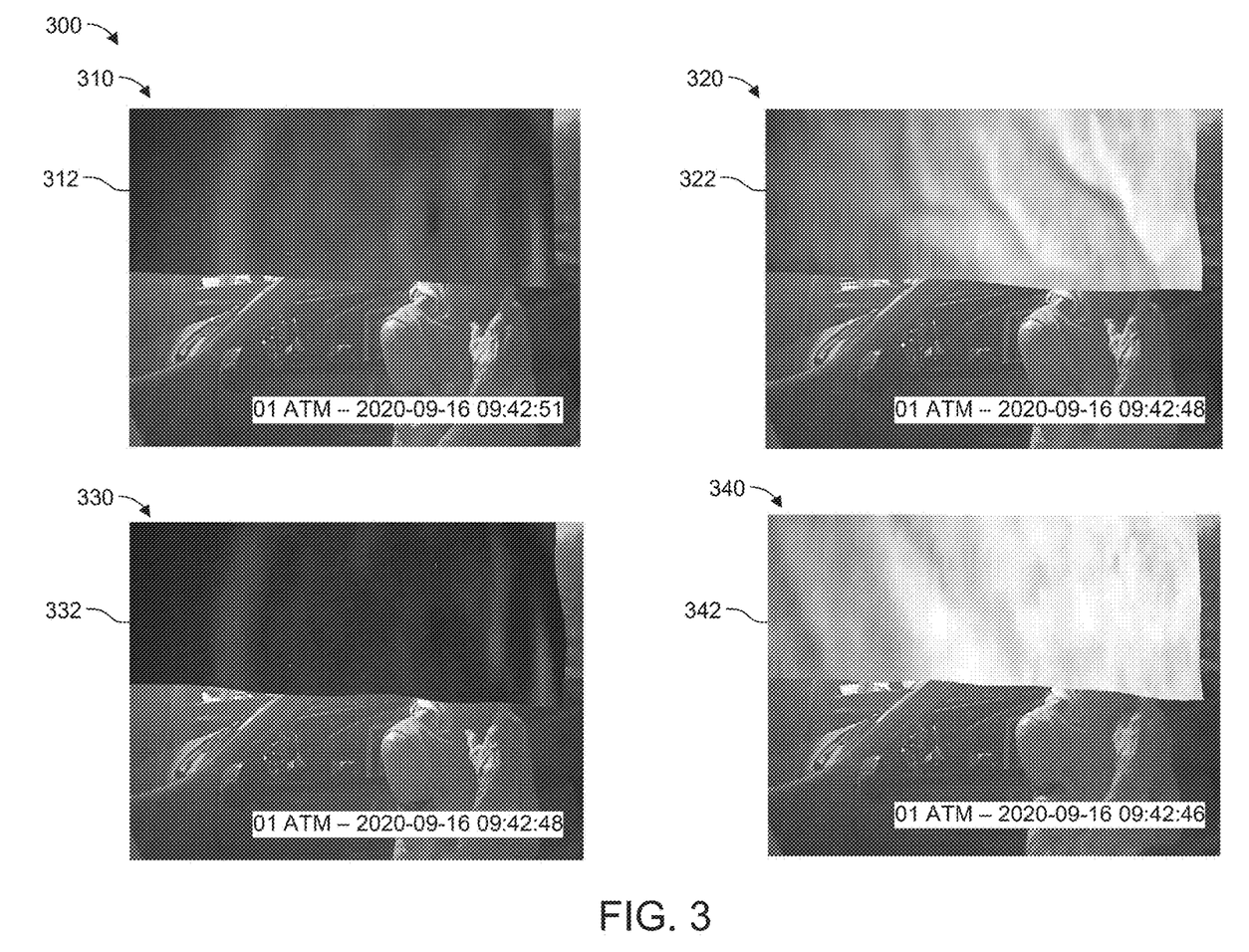
FIG. 3 illustrates example training video frames for training the fraud detection system.

FIG. 3 illustrates example training video frames 300 for training the fraud detection system 102. In example implementations, the fraud detection system 102 uses the training video frames 300 to train machine learning techniques to detect partial obstructions, such as tape placed over the camera. The training video frames 300 include a first training image 310, a second training image 320, a third training image 330, and a fourth training image 340. The first training image 310 includes a first rendered obstruction 312, the second training image 320 includes a second rendered obstruction 322, the third training image 330 includes a third rendered obstruction 332, and the fourth training image 340 includes a fourth rendered obstruction 342. The first rendered obstruction 312, the second rendered obstruction 322, the third rendered obstruction 332, and the fourth rendered obstruction 342 are rendered to resemble tape or some other obstruction partially covering the image with varying color, size, position, angle, thickness, opacity, and the like in this embodiment.

In certain embodiments, the first training image 310, second training image 320, third training image 330, and the fourth training image 340 have a tag that indicates the images have rendered obstructions. The fraud detection system 102 can use the first training image 310, second training image 320, third training image 330, the fourth training image 340, training images with no obstruction, and/or additional training images with obstructions to train the machine learning techniques. In an example implementation, the machine learning techniques determine whether an image has an obstruction and compare each determination to the tag that indicates if the image has an obstruction when training. Therefore, the machine learning techniques determine when the determination is incorrect and can repeatedly train to correctly detect the presence or absence of an obstruction. In another implementation, the fraud detection system 102 compares the machine learning techniques determinations with the tags and provides the results to the machine learning techniques.

Figure 4:
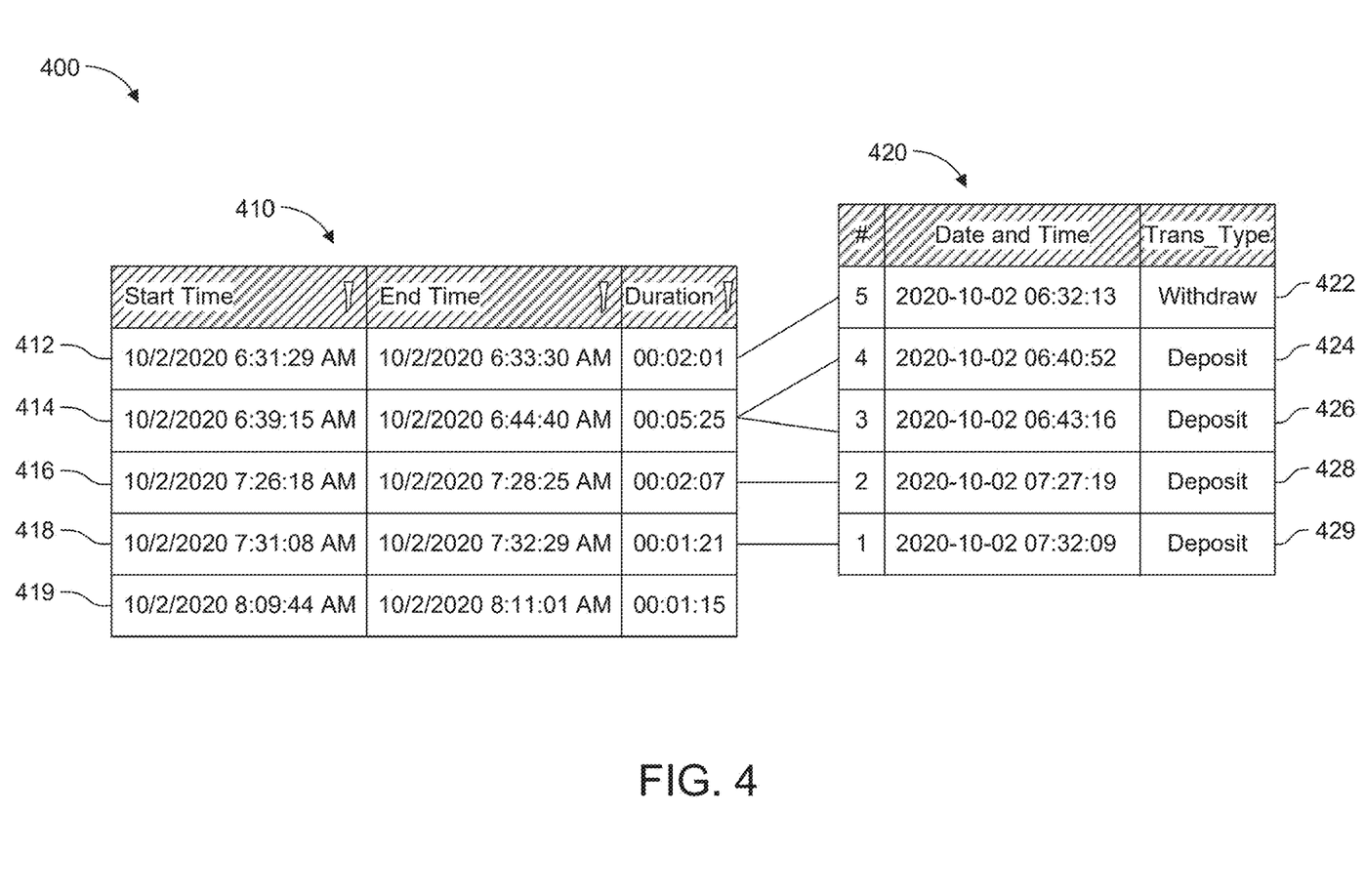
FIG. 4 illustrates tables with example access events and transaction times.

FIG. 4 illustrates tables 400 with example access events and transaction times. The tables 400 include an access event table 410 and a transaction table 420. In example implementations, the fraud detection system 102 determines when access events occur and determine a start time, end time, and duration for the determined access events. For example, the fraud detection system 102 uses a date tag and/or time tag for the first image and the last image of a determined access event to determine the start time and end time respectively. The fraud detection system 102 determines the duration using the start time and the end time in some examples. The monitored machine can send the transaction time and transaction type to the fraud detection system 102. In some embodiments, the fraud detection system 102 uses the access event table 410 and the transaction table 420 to determine if a transaction occurs during an access event, because, for example, the fraud detection system 102 determines that an access event is less likely to be a fraud event when a transaction occurs during an access event and more likely to be a fraud event when a transaction does not occur during an access event. The fraud detection system 102 can also use the duration and/or the transaction type to determine if the access event is an expected length of time for the associated transaction type. For example, a the fraud detection system 102 determines a person typically takes between two to ten minutes to perform a withdrawal or deposit at an ATM. When the access event duration is shorter or longer than the expected length of time, the fraud detection system 102 determines that it is more likely a fraud event occurred, because the person may be installing a fraud device during the shorter or longer time spent at the monitored device for example.

The access event table 410 includes a first access event 412, a second access event 414, a third access event 416, a fourth access event 418, and a fifth access event 419. The transaction table 420 includes a first transaction 422, a second transaction 424, a third transaction 426, a fourth transaction 428, and a fifth transaction 429. The access events in the access event table 410 and the transactions in the transaction table 420 all occur on the same day in this example.

The first access event 412 has a start time of 6:31:29 AM an end time of 6:33:30 AM. The first transaction 422 occurs at 6:32:13, between the start time and end time of the first access event 412. Therefore, the fraud detection system 102 associates the first access event 412 with the first transaction 422.

The second access event 414 has a start time of 6:39:15 AM an end time of 6:44:40 AM. The second transaction 424 occurs at 6:40:52 AM and the third transaction 426 occurs at 6:43:16 AM, both between the start time and end time of the second access event 414. Therefore, the fraud detection system 102 associates the second access event 414 with the second transaction 424 and the third transaction 426.

The third access event 416 has a start time of 7:26:18 AM an end time of 7:28:25 AM. The fourth transaction 428 occurs at 7:27:19 AM, between the start time and end time of the third access event 416. Therefore, the fraud detection system 102 associates the third access event 416 with the fourth transaction 428.

The fourth access event 418 has a start time of 7:31:08 AM an end time of 7:32:29 AM. The fifth transaction 429 occurs at 7:32:09 AM, between the start time and end time of the fourth access event 418. Therefore, the fraud detection system 102 associates the fourth access event 418 with the fifth transaction 429.

The fifth access event 419 has a start time of 8:09:44 AM an end time of 8:11:01 AM. The transaction table 420 does not include any transactions between the fifth access event's 418 start and end time. Therefore, the fraud detection system 102 determines that there is no transaction during the fifth access event 419 and that a fraud event is more likely to have occurred during the fifth access event 419. In an example implementation, the fraud detection system 102 causes the detection processor 112 to perform fraud detection (e.g., executing the machine learning techniques) on the images associated with the fifth access event, flag the fifth access event 419 for review, and the like.

Figure 5:
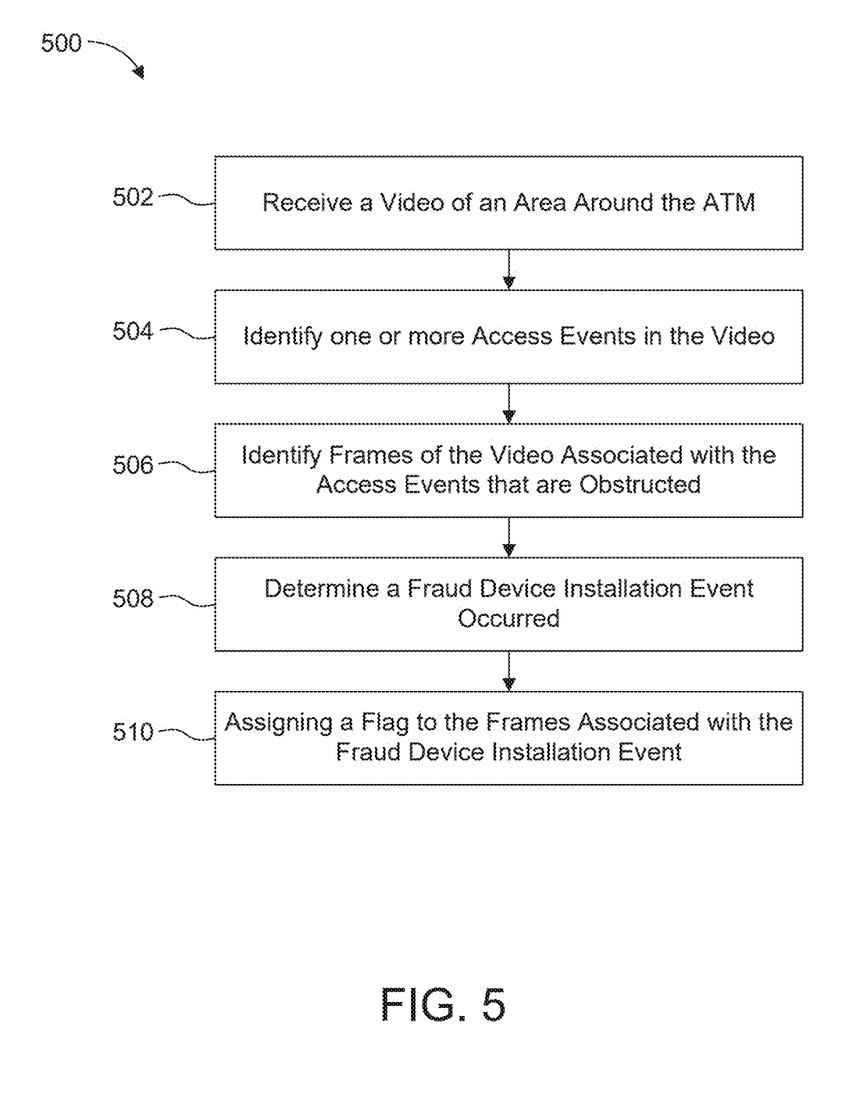
FIG. 5 illustrates an example method for video-based fraud detection.

FIG. 5 illustrates an example method 500 for video-based fraud detection. In some examples, the method 500 is used for a monitored ATM. The method 500 is used for other types of monitored devices in other examples. The method 500 begins at operation 502, and a video of an area around the ATM is received. For example, a camera of the ATM captures the video, and the fraud detection system 102 receives the video.

In operation 504, one or more access events are determined. For example, the fraud detection device determines an access event occurs based on frames of the video that include a detected object. The video processor 110 creates images for each frame of the video, and the detection processor 112 evaluates the created images to detect objects in the images. The detection processor 112 determines an access event occurs based on the detected objects. For example, the detection processor 112 operates to determine an access event occurs by determining a detected person approaches the ATM and that the detected person accesses or otherwise interacts with the ATM in the images.

In operation 506, frames of the video from the one or more access events that are obstructed by an object are identified using a machine learning technique. For example, once the detection processor 112 determines an access event occurs in operation 504, the detection processor evaluates the images associated with the access event using a machine learning technique (e.g., a CNN). The machine learning technique evaluates the images associated with the access event to determine if any of the images are partially obstructed by an object. The obstruction can be a full obstruction of the camera view in some or all images.

In operation 508, a fraud device installation event is determined to have occurred. For example, the fraud detection system 102 determines the fraud device installation event occurred based on determining that a predetermined number of images associated with the frames of the video from one of the access events are identified as partially obstructed. In some embodiments, the fraud detection system 102 determines the fraud device installation occurs based on a percentage of the frames associated with the access event being partially obstructed (e.g., at least 25%, at least 50%, at least 75%) or based on a predetermined number of frames being partially obstructed for a period (e.g., ten frames are partially obstructed in a fifteen frame period).

In operation 510, a flag is assigned to the frames associated with the fraud device installation event. For example, the fraud detection system 102 assigns a flag to the images of the frames and/or the portion of the video associated with the access event that the fraud detection system 102 identified as a fraud device installation event. A user can review the flagged images and/or portion of the video to determine if the fraud installation event occurred to then remove the fraud device, determine if accounts were compromised by the fraud device, determine the identity of the person that installed the fraud device, and the like.

Figure 6:
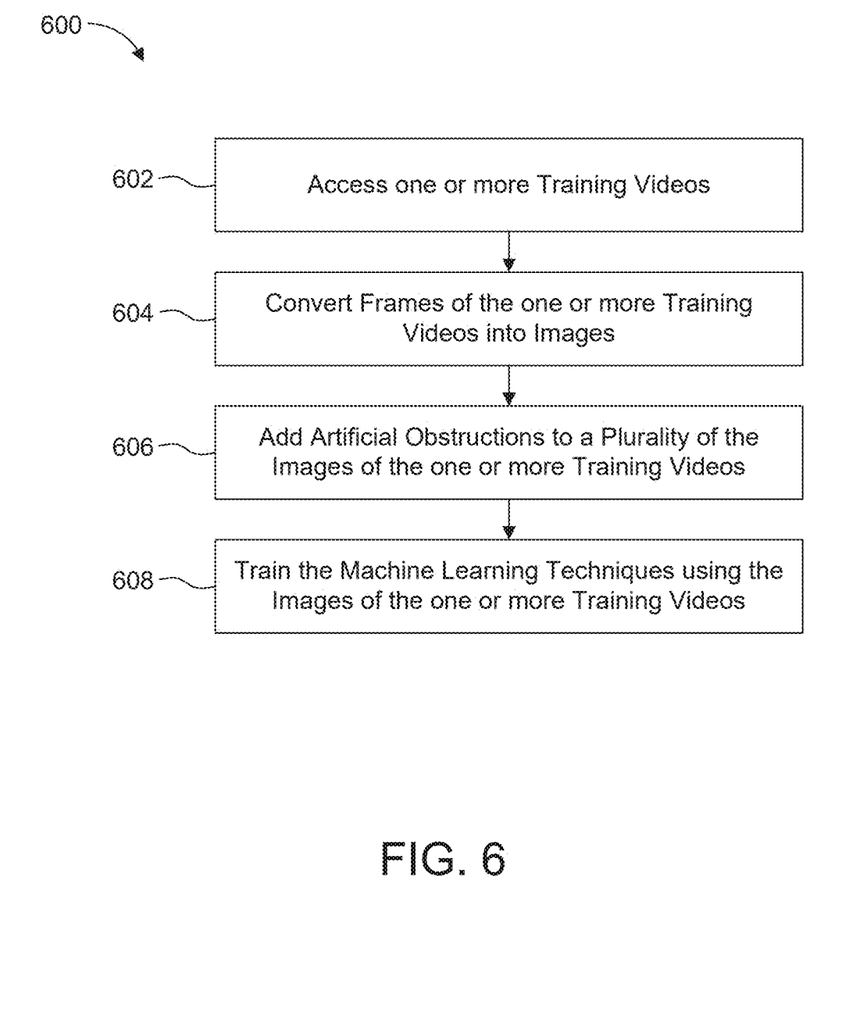
FIG. 6 illustrates an example method for training a machine learning technique for video-based fraud detection.

FIG. 6 illustrates an example method 600 for training a machine learning technique for video-based fraud detection. In some embodiments, the fraud detection system 102 trains the machine learning technique to detect partial obstructions, such as tape over a camera. The method 600 begins at operation 602, and one or more training videos is accessed. For example, the fraud detection system 102 accesses videos from one or more monitored devices.

In operation 604, frames of the one or more training videos are converted into images. For example, the video processor 110 converts the frames of the one or more videos into images that can be input into the machine learning technique that is training.

In operation 606, artificial obstructions are added to a plurality of the images of the one or more training videos. For example, the video processor 110 adds artificial obstructions that partially or fully obstruct the images, such adding the first rendered obstruction 312 to the first training image 310, adding the second rendered obstruction 322 to the second training image 320, adding the third rendered obstruction 332 to the third training image 330, and adding the fourth rendered obstruction 342 to the fourth training image 340. In some embodiments, the artificial obstructions have different features, including color, size, position, angle, thickness, opacity, and the like. The video processor 110 may tag the images that the video processor 110 adds artificial obstructions to.

In operation 608, the machine learning techniques are trained using the frames of the one or more training videos. For example, the detection processor 112 provides the images to the machine learning technique. The machine learning technique attempts to detect images with obstructions, provide the results to the fraud detection system 102, and receive feedback on the machine learning technique's performance. The machine learning technique performs iterative training by repeatedly attempting to detect the artificial obstructions and revising the attempts based on the feedback received in some embodiments.

Examples of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary examples discussed without departing from the scope of the present invention. For example, while the examples described above refer to particular features, the scope of this invention also includes examples having different combinations of features and examples that do not include all of the described features. Accordingly, the scope of the present invention is intended to embrace all such alternatives, modifications, and variations together with all equivalents thereof.

While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an example in the present disclosure can be references to the same example or any example; and such references mean at least one of the examples.

Reference to "one example" or "an example" means that a particular feature, structure, or characteristic described in connection with the example is included in at least one example of the disclosure. The appearances of the phrase "in one example" in various places in the specification are not necessarily all referring to the same example, nor are separate or alternative examples mutually exclusive of other examples. Moreover, various features are described which may be exhibited by some examples and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various examples given in this specification.

Without intent to limit the scope of the disclosure, examples of instruments, apparatus, methods, and their related results according to the examples of the present disclosure are given above. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

What is claimed is:

1. A method for detecting fraud device installation at an automated teller machine (ATM), comprising:
    training a machine learning technique, the training comprising:
        accessing one or more training videos,
        converting frames of the one or more training videos into images,
        adding artificial obstructions to a plurality of the images of the one or more training videos, including selecting a color, size, position, thickness, and opacity for the artificial obstructions, and
        training the machine learning technique using the images of the one or more training videos;
    receiving a video of an area around the ATM;

identifying one or more access events of the ATM based on frames of the video that indicate a detected object in the area;

evaluating frames of the video associated with the one or more access events using the machine learning technique to identify one or more obstructed frames that are obstructed by an object;

determining a predetermined number of frames from an access event of the one or more access events are partially obstructed based on the identified one or more obstructed frames;

determining a fraud device installation event occurred at the ATM based on the determination the predetermined number of frames from the access event are partially obstructed; and assigning a flag to frames associated with the fraud device installation event.

2. The method of claim 1, further comprising:

creating images of frames of the video, wherein:
  identifying one or more access events based on the frames of the video that indicate the detected object includes evaluating the images;
  identifying frames of the video associated with the one or more access events that are obstructed by the object using the machine learning technique includes providing the images to the machine learning technique as input; and
  determining the fraud device installation event occurred based on determining that the predetermined number of frames from one of the access events are identified as partially obstructed includes evaluating the images.

3. The method of claim 1, wherein:

identifying frames of the video associated with the one or more access events that are obstructed includes using additional machine learning techniques; and determining the fraud device installation event occurred based on determining that the predetermined number of frames from one of the access events are identified as partially obstructed includes determining at least two of (i) the machine learning technique, (ii) the additional machine learning techniques, or (iii) a combination of (i) and (ii) identify the predetermined number of frames from one of the access events as partially obstructed.

4. The method of claim 1, wherein the object is tape.

5. The method of claim 1, further comprising determining no transaction occurred during the access event, wherein determining the fraud device installation event occurred is based on the determination that no transaction occurred.

6. The method of claim 1, further comprising identifying a detected fraud device, wherein determining the fraud device installation event occurred is based on identifying the detected fraud device.

7. The method of claim 1, further comprising:

detecting a face of a person in one or more of the frames of the fraud device installation event; and storing an image of the face of the person.

8. The method of claim 7, further comprising:

detecting the face of the person in a new video based on accessing the image of the person; and determining a new fraud device installation event occurred based on detecting the face of the person in the new video.

9. A system for video-based fraud detection, comprising:

a detection processor operable to:

train a machine learning technique, the training comprising:
  accessing one or more training videos,
  converting frames of the one or more training videos into images,
  adding artificial obstructions to a plurality of the images of the one or more training videos, including selecting a color, size, position, thickness, and opacity for the artificial obstructions, and
  training the machine learning technique using the images of the one or more training videos;

receive a video of an area around an automated teller machine (ATM);

identify one or more access events of the ATM based on frames of the video that indicate a detected object in the area;

evaluate frames of the video associated with the one or more access events using the machine learning technique to identify one or more obstructed frames that are obstructed by an object;

determine a predetermined number of frames from an access event of the one or more access events are partially obstructed based on the identified one or more obstructed frames;

determine a fraud device installation event occurred at the ATM based on the determination the predetermined number of frames from the access event are partially obstructed; and assign a flag to frames associated with the fraud device installation event.

10. The system of claim 9, further comprising a video processor operable to:

create images of frames of the video, wherein to:
  identify one or more access events based on the frames of the video that indicate the detected object include to evaluate the images;
  identify frames of the video associated with the one or more access events that are obstructed by the object using the machine learning technique includes to provide the images to the machine learning technique as input; and
  determine the fraud device installation event occurred based on determining that the predetermined number of frames from one of the access events are identified as partially obstructed includes to evaluate the images.

11. The system of claim 9, wherein to:

identify frames of the video associated with the one or more access events that are obstructed includes to use additional machine learning techniques; and determine the fraud device installation event occurred based on determining that the predetermined number of frames from one of the access events are identified as partially obstructed includes to determine at least two of (i) the machine learning technique, (ii) the additional machine learning techniques, or (iii) a combination of (i) and (ii) identify the predetermined number of frames from one of the access events as partially obstructed.

12. The system of claim 9, wherein the object is tape.

13. The system of claim 9, wherein the detection processor is further operable to determine no transaction occurred during the access event, wherein determining the fraud device installation event occurred is based on the determination that no transaction occurred.

14. The system of claim 9, wherein the detection processor is further operable to identify a detected fraud device, wherein determining the fraud device installation event occurred is based on identifying the detected fraud device.

15. The system of claim 9, wherein the detection processor is further operable to:
   detect a face of a person in one or more of the frames of the fraud device installation event; and
   store an image of the face of the person.

16. The system of claim 15, wherein the detection processor is further operable to:
   detect the face of the person in a new video based on accessing the image of the person; and
   determine a new fraud device installation event occurred based on the detection.

17. A non-transitory computer-readable medium storing instructions that, when executed by one or more processors, cause the one or more processors to:
   generate a machine learning technique by:
      accessing one or more training videos;
      converting frames of the one or more training videos into images;
      adding artificial obstructions to a plurality of the images of the one or more training videos, including selecting a color, size, position, thickness, and opacity for the artificial obstructions; and
      training the machine learning technique to detect fraud device installation using the plurality of the images of the one or more training videos; and
   detect a fraud device installation event at an automated teller machine (ATM) by:
      receiving a video of an area around the ATM;
      identifying one or more access events of the ATM based on frames of the video that indicate a detected object in the area;
      evaluating frames of the video associated with the one or more access events using the machine learning technique to identify one or more obstructed frames that are obstructed by an object;
      determining a predetermined number of frames from an access event of the one or more access events are partially obstructed based on the identified one or more obstructed frames;
      determining the fraud device installation event occurred at the ATM based on the determination the predetermined number of frames from the access event are partially obstructed; and
      assigning a flag to frames associated with the fraud device installation event.

18. The non-transitory computer-readable medium of claim 17, wherein the non-transitory computer-readable medium stores further instructions that, when executed by the one or more processors, cause the one or more processors to:
   create images of frames of the video,
   wherein:
      identifying one or more access events based on the frames of the video that indicate the detected object includes evaluating the images;
      identifying frames of the video associated with the one or more access events that are obstructed by the object using the machine learning technique includes providing the images to the machine learning technique as input; and
      determining the fraud device installation event occurred based on determining that the predetermined number of frames from one of the access events are identified as partially obstructed includes evaluating the images.

19. The non-transitory computer-readable medium of claim 17, wherein:
   identifying frames of the video associated with the one or more access events that are obstructed includes using additional machine learning techniques; and
   determining the fraud device installation event occurred based on determining that the predetermined number of frames from one of the access events are identified as partially obstructed includes determining at least two of (i) the machine learning technique, (ii) the additional machine learning techniques, or (iii) a combination of (i) and (ii) identify the predetermined number of frames from one of the access events as partially obstructed.

20. The non-transitory computer-readable medium of claim 17, wherein the object is tape.

* * * * *